US00RE34292E

United States Patent [19]

Bingman et al.

[11] E Patent Number: Re. 34,292

[45] Reissued Date of Patent: Jun. 22, 1993

[54] REFUSE COLLECTION AND LOADING SYSTEM

[75] Inventors: John Bingman, Mesa; Armand G. Mezey, Phoenix, both of Ariz.

[73] Assignee: Sunbelt Automated Systems, Inc., Phoenix, Ariz.

[21] Appl. No.: 791,078

[22] Filed: Nov. 12, 1991

Related U.S. Patent Documents

Reissue of:

[64] Patent No.: 5,049,026
Issued: Sep. 17, 1991
Appl. No.: 480,815
Filed: Feb. 16, 1990

[51] Int. Cl.[5] ..... B65F 3/04

[52] U.S. Cl. ..... 414/408; 294/86.4; 294/902; 414/409; 414/700; 414/733; 414/786

[58] Field of Search ..... 414/406, 408, 409, 540, 414/541, 629, 631, 632, 700, 733; 294/86.4, 902

[56] References Cited

U.S. PATENT DOCUMENTS

| | | | |
|---|---|---|---|
| 3,762,586 | 10/1973 | Updike, Jr. | 414/408 |
| 3,765,554 | 10/1973 | Morrison | 414/700 X |
| 3,910,434 | 10/1975 | Ebeling et al. | 414/408 |
| 4,057,156 | 11/1977 | Thompson et al. | 414/408 |
| 4,313,707 | 2/1982 | Bingman et al. | 414/409 |
| 4,401,407 | 8/1983 | Breckenridge | 414/408 |
| 4,461,607 | 7/1984 | Smith | 294/902 X |
| 4,597,710 | 7/1986 | Kovats | 414/409 |
| 4,669,940 | 6/1987 | Englehardt et al. | 414/409 X |
| 4,699,557 | 10/1987 | Barnes | 414/409 X |
| 4,923,362 | 5/1990 | Fryk | 414/700 |

*Primary Examiner*—David A. Bucci
*Attorney, Agent, or Firm*—Gregory J. Nelson

[57] ABSTRACT

An automated vehicle-mounted refuse collection system having a loader with a boom assembly having inner and outer pairs of arms attached to the vehicle at spaced-apart locations. A lift assembly is pivotally connected to the upper end of the boom so outward movements of the boom arm will cause the upper and lower ends of the lift to reach or extend away from the vehicle toward a refuse container. Gripping arms are mounted on a carriage reciprocal along the lift assembly. A hydraulic system maintains the gripping arm level during extension and retraction of the boom arms.

16 Claims, 6 Drawing Sheets

REFUSE COLLECTION AND LOADING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to an improved refuse loader and more particularly to a mobile refuse or trash collection loader for engaging, lifting, tilting and emptying on-site trash containers into a compartment of a mobile collection vehicle.

Mobile trash or refuse collection systems are widely known and have been utilized in response to the need for systems for the efficient collection of large volumes of trash such as residential garbage. These systems generally utilize on-site trash collection containers of various sizes usually from approximately 50 to 300 gallons. The on-site containers are filled by the user and periodically the contents of the container are transferred to a mobile collection vehicle and the refuse is taken to a dump, land fill or recycling center.

In order to provide a mechanism for efficiently emptying the on-site containers into the collection vehicle, various apparatus can be found in the prior art. These apparatus generally incorporate a lifting mechanism which raise the trash container to an elevated position and thereafter tilt the container to empty the contents of the container into the collection vehicle.

One particular problem with mobile collection systems of the type generally described above is the provision of an effective lift and loading mechanism for engaging, lifting and lowering the trash container. The on-site trash container may be positioned at various distances from the collection vehicle and the lift and loading mechanism accordingly must be capable of accomodating various size and shape containers positioned at various distances from the collection vehicle. In response to this need, the following are representative of prior art systems.

2. Description of Prior Art

U.S. Pat. No. 4,313,707 issued Feb. 2, 1982 to John W. Bingman, discloses a trash collection apparatus that mounts in a fixed position on the side of the trash collection vehicle. A frame member is extendably secured to the vehicle for movement away from and toward the truck body or bed. A pair of vertically extending guide rails are secured to the frame. A carriage is mounted for movement along the guide rails and has a pair of gripping arms which are pivoted for movement in a horizontal plane to grasp the trash container. The gripping arms are also pivoted for movement in vertical planes for movement to a stowed position. Hydraulic actuators are provided to raise the carriage and tilt the top section of the rails when the carriage is positioned on the top sections to empty the contents of the trash container into the vehicle. The frame is laterally extendable from the truck through the use of hydraulic components so that the carriage and gripping arms may be extended to the location of the container laterally adjacent the truck and withdrawn toward the truck during lifting operations and for storage.

Another arrangement is exemplified by U.S. Pat. No. 4,726,726 issued Feb. 23, 1988. This patent shows a device for lifting, tilting and discharging the contents of garbage containers into collection vehicles. The device has a transverse, mobile slider with a head which can be retracted within the truck's dimensions or extended on one side. The head is carried on an arm and is extendable by means of a hydraulic cylinder to bring the head into engagement with the container. Thereafter, the cylinder may be actuated to lift the garbage container and tilt the container to discharge the contents. The reverse operation returns the empty container to its initial position while releasing the coupling head.

U.S. Pat. No. 3,910,434 shows a driver-operated, vertical mast arrangement which mechanically engages and elevates containers to the top of a vehicle body, discharge the material into the vehicle and returns the container to a location spaced from the vehicle and then telescopically retracts the container pick-up mechanism.

A particularly effective automated side-loading recycling collection system is sold under the name "Flexi-Dump" which system is the subject of co-pending application Ser. No. 07/281,558 in the name of the present inventor, John W. Bingman. The Flexi-Dump system has a carriage assembly on vertical tracks on the side of the collection vehicle. The carriage assembly is movable to between a vertical upper "dump" position and a vertical down or "home" position. In the home position, the carriage assembly is positioned at the side of the collection vehicle and may be laterally or horizontally extended a pre-determined distance to retainably receive or engage a refuse container. The extension of the carriage-mounted gripping arms is accomplished by means of a scissors assembly. In the home position, the carriage assembly is positioned at the side of the collection vehicle and may be laterally or horizontally extended a pre-determined distance to receivably retain or engage a refuse container. Once engaged, the refuse container is retracted to the home position and the moved upwardly along the tracks on the carriage until the contents of the refuse container are emptied or dumped into one of the compartments of the vehicle. The empty carriage is then returned to the home position. The collection vehicle is then ready to proceed to another location site where the procedure may be repeated.

The systems described above represent improvements in refuse container lift systems as they allow the container gripping means to be laterally extended from the collection vehicle. These systems, particularly the Flexi-Dump system, work well in many applications. However, some applications, particularly those which involve larger volume containers, require a system having the ability to efficiently and quickly extend or reach out and pick up a refuse container, retract the container toward the side of the truck and raise the container to a "dump" position and thereafter lower and return the empty container to the position on the ground.

SUMMARY OF THE INVENTION

Accordingly, the present invention provides a refuse collection apparatus which is automated and which involves components which are simple and require low maintenance minimizing break-down and delays in the refuse collection routine.

Accordingly, it is a broad object of the present invention to provide an improved refuse collection system.

It is another object of the present invention to provide improved side-loading refuse container pick-up and loading system for a refuse collection truck which may be retrofit on existing collection vehicles.

It is a further object of the present invention to provide a loader assembly that minimizes the time required to pick up a refuse container to be emptied, raise the container and dump its contents into the refuse collection vehicle and thereafter lower the empty refuse container and reposition it on the ground.

It is another object of this invention to provide a system for maximizing the dumping efficiency of refuse loader systems.

It is yet another object of the present invention to provide a refuse container pick-up and loading system for a refuse collection vehicle in which the pick-up, emptying, re-positioning operations are substantially automated.

It is yet another object of the present invention to provide an improved container loader system for a refuse collection vehicle which will efficiently accomodate large volume containers.

It is yet another object of the present invention to provide an improved refuse container pick-up and loading system having boom and lift assemblies extendable and retractable from the vehicle which lift assembly carries container engaging and lifting means.

It is another object of the present invention to provide a removable attachment for a container gripping device which is adapted to pick up loose, uncontained refuse such as tree branches and discarded Christmas trees.

It is yet another object of the present invention to provide a refuse container loader system which is extendable and retractable from a collection vehicle having gripping means which maintain the container in a level position as retraction and extension occurs.

Briefly, the present invention relates to an improved loader for refuse collection vehicles. The loader of the present invention is mobile and is adapted to be mounted on a refuse vehicle which proceeds along a route until the vehicle comes to a pick-up station where a refuse container is located. The collection vehicle normally stops adjacent and spaced a distance from the refuse container with the loader generally aligned with the container. The loader includes a boom assembly having a pair of inner arms attached to the frame of the collection vehicle at first pivot locations. A second pair of outer boom arms are pivotally attached to the vehicle frame or chassis at second locations spaced from the first pivot locations. A lift assembly is pivotally connected at the upper end of the boom assembly at pivot points which along with the lower pivot points establish an unequal parallelogram relationship, forming a knuckle joint mechanism. The inner boom arms are operably attached at a hydraulic actuator so that upon extension of the actuator rod, the boom arms are outwardly pivoted away from the vehicle. The outward pivotal movement of the boom arms will cause displacement of the relative location of the pivot points on the upper end of the inner and outer boom arms causing the upper and lower ends of the lift assembly to reach or extend horizontally away from the boom arm pair as the boom arms pivot.

In the home position, both boom arm pairs and the lift assembly are disposed in a vertical position adjacent the vehicle. Pressurization of the extension actuator will cause the boom assembly to pivot outwardly causing the lower end of the lift arm to move laterally a predetermined distance to engage a refuse container at an extended pick-up position. Engagement means which in the preferred embodiment are in the form of gripping arms, are positioned at the lower end of the lift arm are selectively closable by gripping actuators to engage the exterior of the refuse container. Leveling of the container is accomplished by a pair of hydraulic actuators which interconnect the engagement means to the lower end of the lift assembly. A hydraulic circuit controls the hydraulic actuators to maintain the gripping arms in a generally horizontal position as the boom and lift assemblies are extended and retracted.

The leveling actuators and the gripping arms are part of a carriage which traverses the lift arm on a set of guide wheels within guide tracks. In the preferred embodiment, a length of drive chain operates to move the loader assembly along the guide track through a drive motor and sprocket. As the boom assembly is retracted from the extended or reach pick-up position, the engaged refuse container is moved to a position adjacent the vehicle with the boom retracted and the boom and lift arms generally vertical. The lift mechanism is operated to move the carriage and engaged container upwardly along the track to a position where the container is at least partially inverted causing the contents of the refuse container to be dumped into the receiving area of the refuse collection vehicle. After dumping, the carriage, along with the empty container, returns down the lift to the home position. The boom is extended returning the empty refuse container to its original location at which location the gripping members are released. The boom and lift assemblies are retracted and the truck is ready to move to the next location adjacent a refuse container and the collection cycle is repeated. A removable attachment is cooperable with the gripping arms to pick up loose, uncontained refuse such as tree limbs or discarded Christmas trees.

Preferably, the cycle of operation is automated with limit switches controlling the raising and lowering of the loading carriage. The hydraulic components are sized and interconnected so that the container gripping arms are maintained at a predetermined position during extension and retraction of the boom to maintain the container in a substantially level position.

BRIEF DESCRIPTION OF THE DRAWINGS

The above and other objects and advantages of the present invention will be more fully understood from the following detailed description of the invention taken along with the claims and drawings in which:

DESCRIPTION OF THE PREFERRED EMBODIMENT

Figure 1:
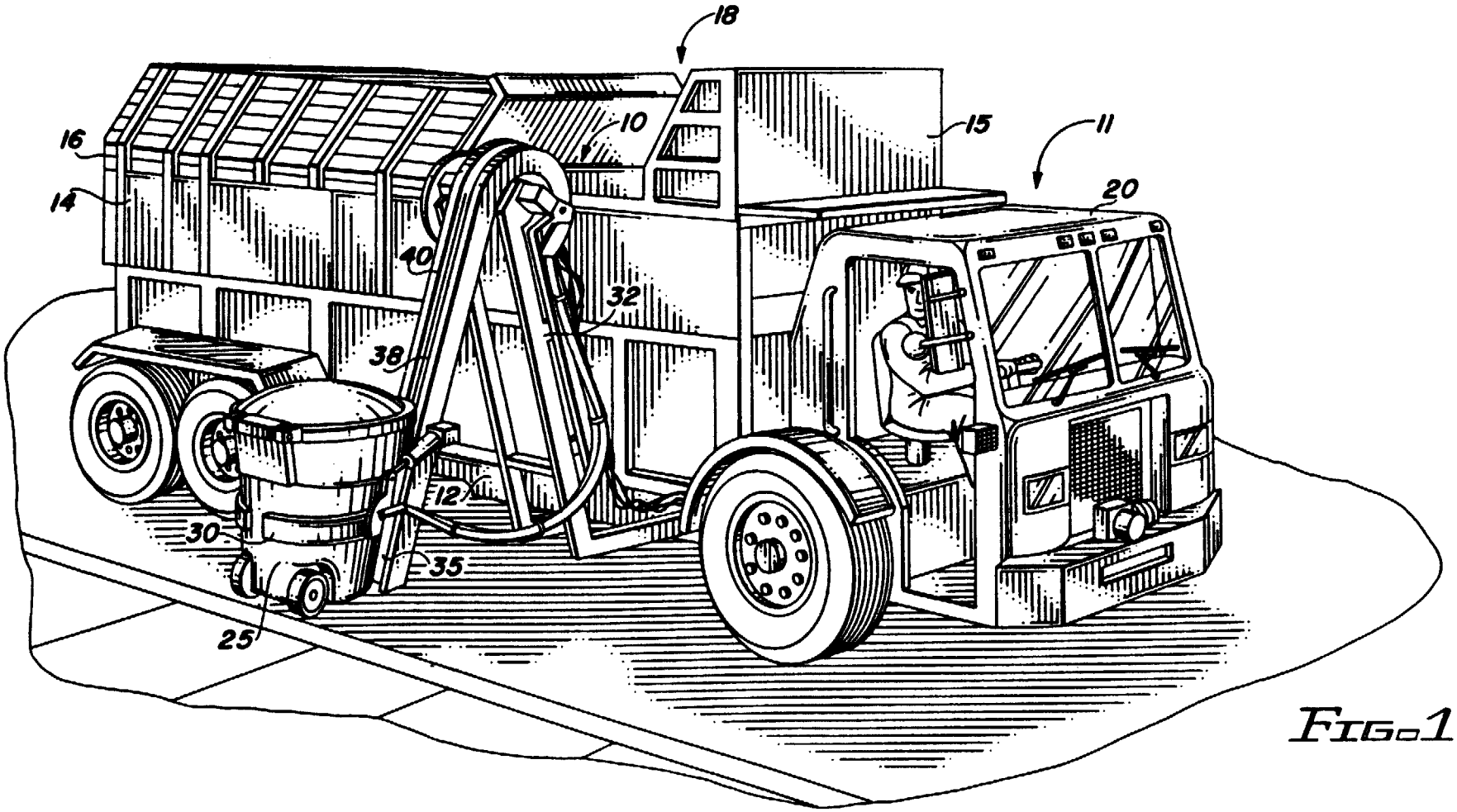
FIG. 1 is a perspective view of a refuse collection vehicle with the container collection and loading system shown therein.

Turning now to the drawings, FIG. 1 generally illustrates a refuse truck 11 equipped with the improved loader assembly of the present invention which is designated by the numeral 10. The refuse truck is conventional having a mobile frame or chassis 12 which support upstanding side walls 14, front wall 15 and rear wall 16 which define a compartment 18 for reception of trash. As is conventional, refuse and trash is dumped into compartment 18 and is periodically compressed by a hydraulically actuated pusher plate, not shown. The refuse truck also includes a cab 20 which houses the operator and the controls. Details of the vehicle are conventional and well-known.

In operation, the refuse truck 11 moves along a designated route until it reaches a pick-up station having one or more trash or refuse containers 25. The truck stops adjacent the refuse container 25 and by means of the loader assembly 10 engages the container and lifts the container 25 from the ground position to an elevated position where it is tilted so the contents are dumped into the refuse compartment 18. The loader then returns the container to the ground position. A primary advantage of the loader of the present invention is that it has a compact boom assembly 32 and a lift assembly 40, extendable from the side wall of the refuse truck to reach and return the container.

The loader assembly 10 includes a carriage 35 mounted on container-grasping mechanism 30 which may be extended and retracted relative to the vehicle in a horizontal position. Carriage 35 travels along parallel guide rails 38 which form part of the lift assembly 40 to elevate the container 25 to the dump position and return the container to a position on the ground after dumping.

FIGS. 2 to 6 illustrate the loader assembly 10 in greater detail. As shown in these figures, the refuse barrel or container 25 may have a generally cylindrical body or may have slightly tapered side walls with a cover or lid 26 hingedly secured to the container body. While conventional refuse containers are generally configured as shown, the present invention may be used with containers of various other sizes and shapes such as rectangular containers because the loader assembly grasps the exterior of the container not requiring any special mechanical locks.

The loader assembly 10 is shown mounted at one of the side walls 14 of the refuse vehicle although other mounting locations are acceptable. The loader assembly 10 has a pair of generally horizontally extending spaced-apart frame members 50 supported from vehicle chassis 12 by vertically-extending structural beam members 52. A tie member 54 is connected to intersection of the vertical and horizontal members 50, 52 and extends beneath the vehicle being secured to the opposite chassis member 12. The members are suitably secured as a weldment. A pair of gusset plates 58 are welded at the intersection of vertical and horizontal members 50 and 52 and each support a stub shaft 62. A box-like structural member 64 extends transversely between the spaced apart plates 58 for additional support.

The boom assembly 32 includes a pair of parallel outer boom arms 60 and 61. Spaced-apart shafts 62 pivotally support outer boom arms 60 and 61 at their lower ends. The boom arms 60 and 61 are similarly constructed, each shown as an elongate tubular member having a pair of plates 65 welded on opposite sides at the lower end of the member which plates have journal members 66 which receive the opposite ends of stub shafts 62.

Figure 2:
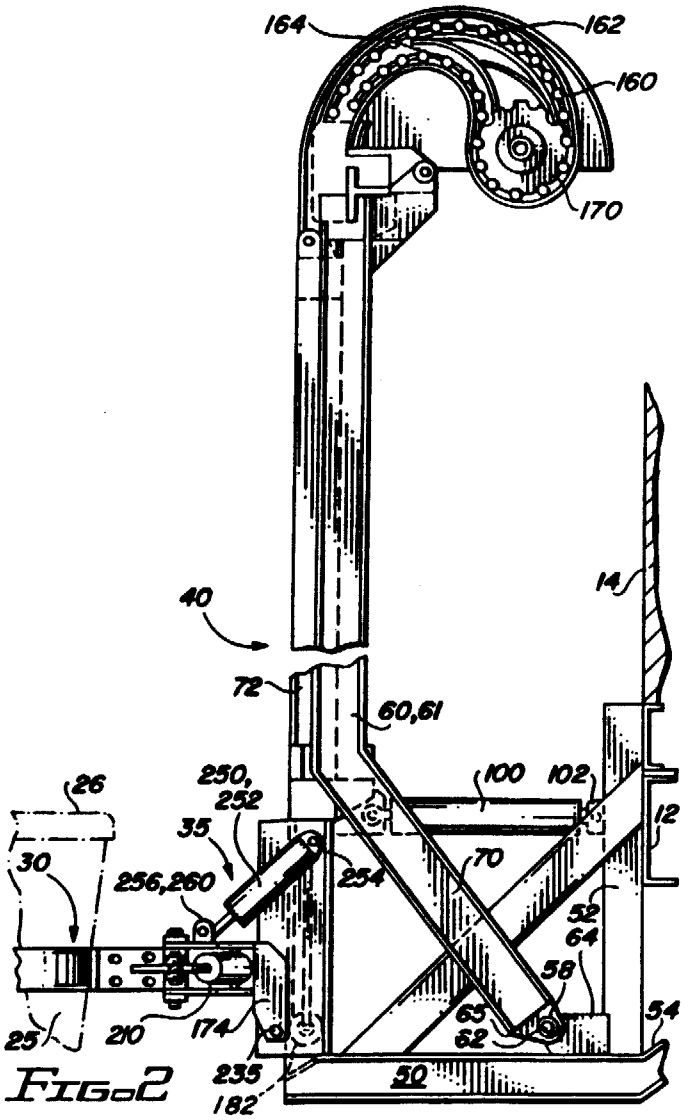
FIG. 2 is a side view, partly in section, showing the loader apparatus in the retracted position.
Figure 4:
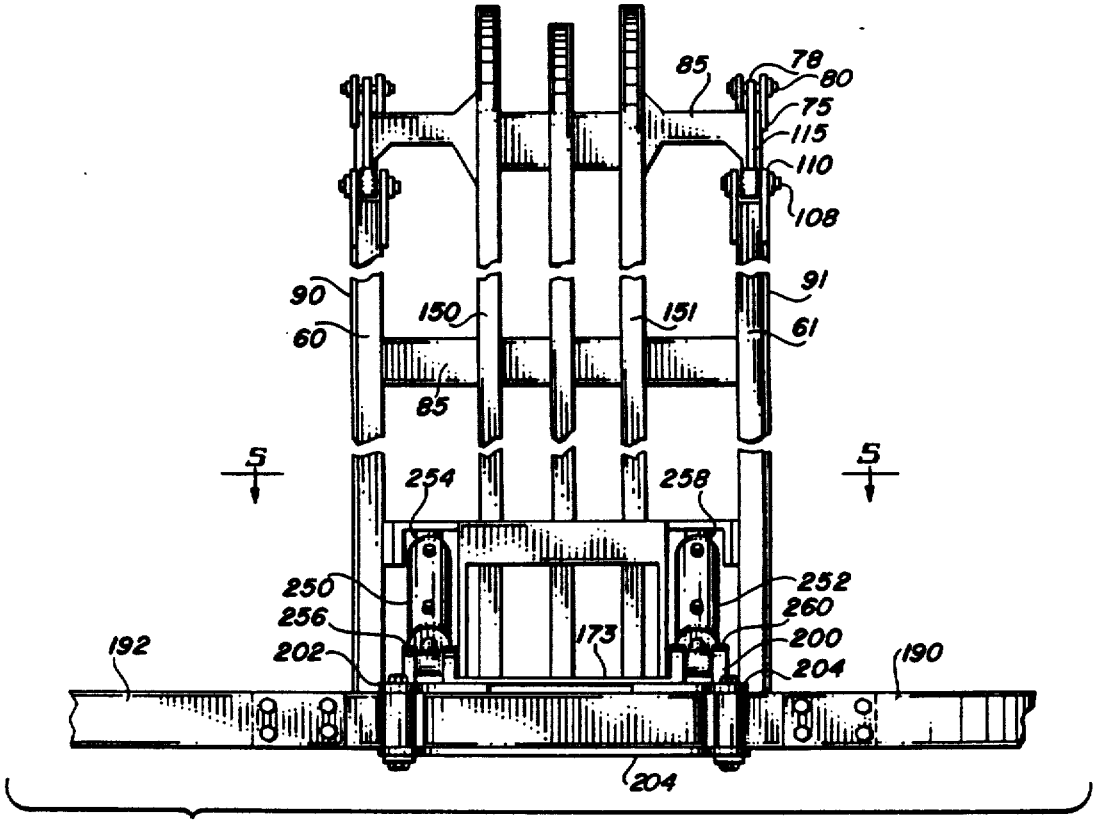
FIG. 4 is a front elevational view of the loading system.

Each of the boom arms 60 and 61 has a lower arm section 70 which in the normal, retracted position as shown in FIG. 2, extends outwardly from the pivot point at an angle of approximately 45° with respect to the vertical. An upper arm section 72 forms an angle of approximately 135° with respect to the lower arm section 70 and in the normal, retracted position assumes a general vertical orientation. As best seen in FIG. 4, a pair of gusset plates 75 are attached as by welding to the upper end of each of the arm sections 72. The plates 75 are provided on opposite sides of each of the arms 60, 61 and receive journal bearing members 78 which are rotative about shaft 80 at a location rearward of the upper boom arm section. Transversely extending cross member 85 is shown as a box-like structural member which forms a part of a knuckle connection at the upper end of the boom members. Box member 85 is rotatively connected to shaft 80 at opposite ends at a location intermediate plates 75 by rearwardly extending plate 86.

A pair of parallel inner boom arms 90 and 91 are spaced-apart between the outer boom arms. The lower ends of each of the inner boom arms 90 and 91 are pivotally attached to the distal end of support members 50 at pivot shafts 92. Note that the pivot shafts 92 are located outward and vertically spaced below the location of pivot shafts 62 about which the outer boom arms rotate. A clevis 95 is centrally attached to cross member 98 extending between the inner boom arms. Hydraulic extension actuator 100 is mounted in a horizontal position having its head end attached at clevis 102 to cross members 99 extending between vertical frame members 52. The rod end 105 of the cylinder is connected to clevis members 95 secured between the inner boom arms. The actuator 100 operates to extend and retract the boom and lift.

The upper end of each of the inner boom arms carries a shaft 108 extending between plates 110 disposed on the opposite upper sides of the arms 90, 91. Cross member 85 is rotatively connected to each of the inner boom arms by a plate 115 which is secured to the cross member and pivotal about shaft 108. When the extension cylinder 100 is actuated extending rod 105, the inner and outer boom arms assume the extended or reach position shown in FIG. 3. In this position, due to the geometric relationship of pivot shafts 62, 92, 80 and 108 which establish an irregular parallelogram, the cross member 85 will rotate to the position shown. As the inner and outer boom arms are pivoted outwardly to the reach position, pivot shafts 80 and 108 move through different radii and accordingly change relative position causing the cross member 85 to rotate about its longitudinal axis. This arrangement is generally designated as a knuckle connection and is used to outwardly pivot the lift assembly 40 as will be explained hereafter. The precise location of the pivot points and the configuration of the boom arms may vary due to physical requirements of the vehicle.

It is noted that both the upper and lower ends of the loader assembly 10 move outward and inward upon actuation. With the arrangement shown, the lower carriage-carrying end of the loader assembly moves at twice the rate of the upper end of the loader assembly. Also, as will be apparent, the carriage may be reciprocably operated during movement of the loader assembly.

Figures 3, 9:
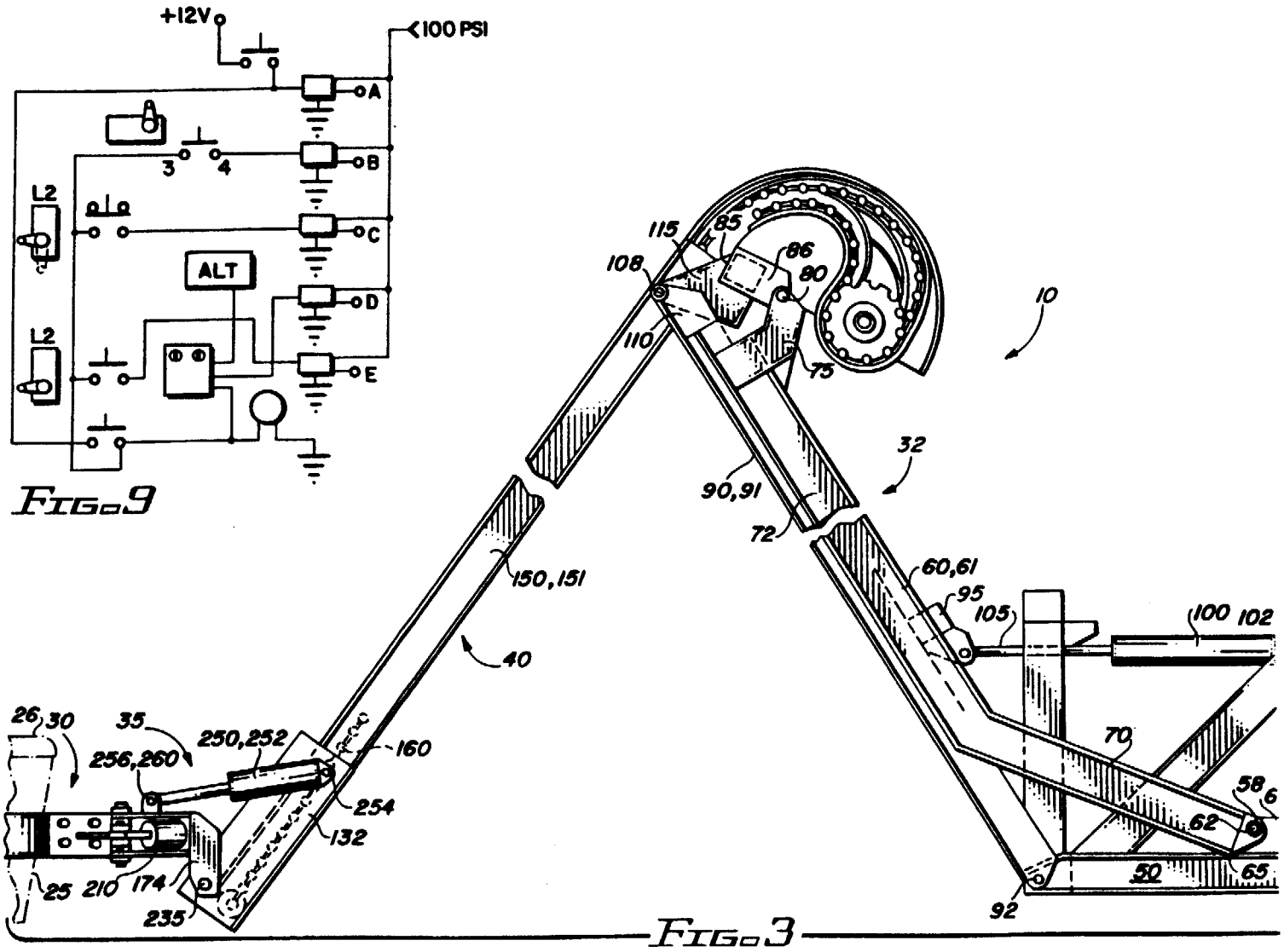
FIG. 3 is a side view, partly in section, showing the loader apparatus in the extended reach position.
FIG. 9 is a schematic diagram of the electrical system for the loading system of the present invention.
Figure 5:
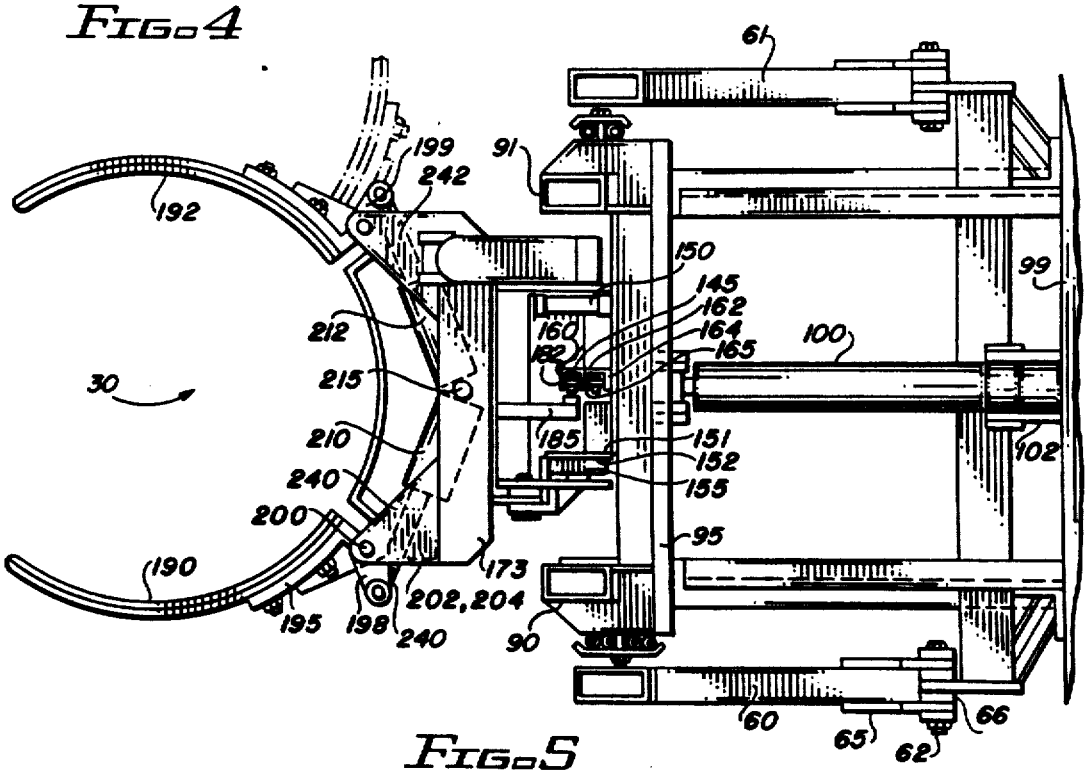
FIG. 5 is a sectional view taken along lines 5—5 of FIG. 4.

FIGS. 3, 4 and 5 best show the carriage 35 including a moveable carriage support 132 which along with the grasping mechanism 30 is reciprocally carried on the lift arm 40 assembly. The lift arm assembly includes a pair of spaced-apart members 150 and 151 which are parallel and which are secured at their upper end to the cross member 85 intermediate the inner boom arms. Each of the members 150 and 151 define a generally rectangular interior channel 152 which receives a sliding block or roller 155 which is pivotally attached to carriage support 132 by post 174 so that reciprocal traverse of the carriage support 132 is guided within the channels.

Figure 6:
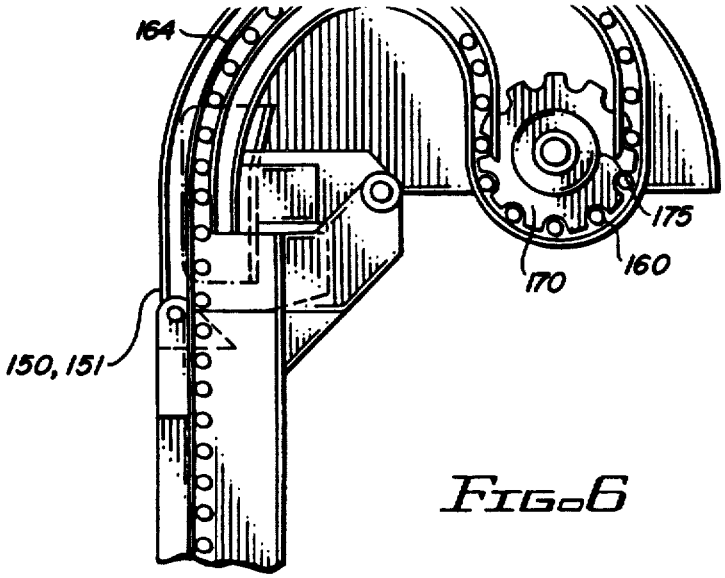
FIG. 6 and 7 are partial sectional views of the lift assembly showing, respectively, the lift assembly in an elevated and lowered position.
Figure 7:
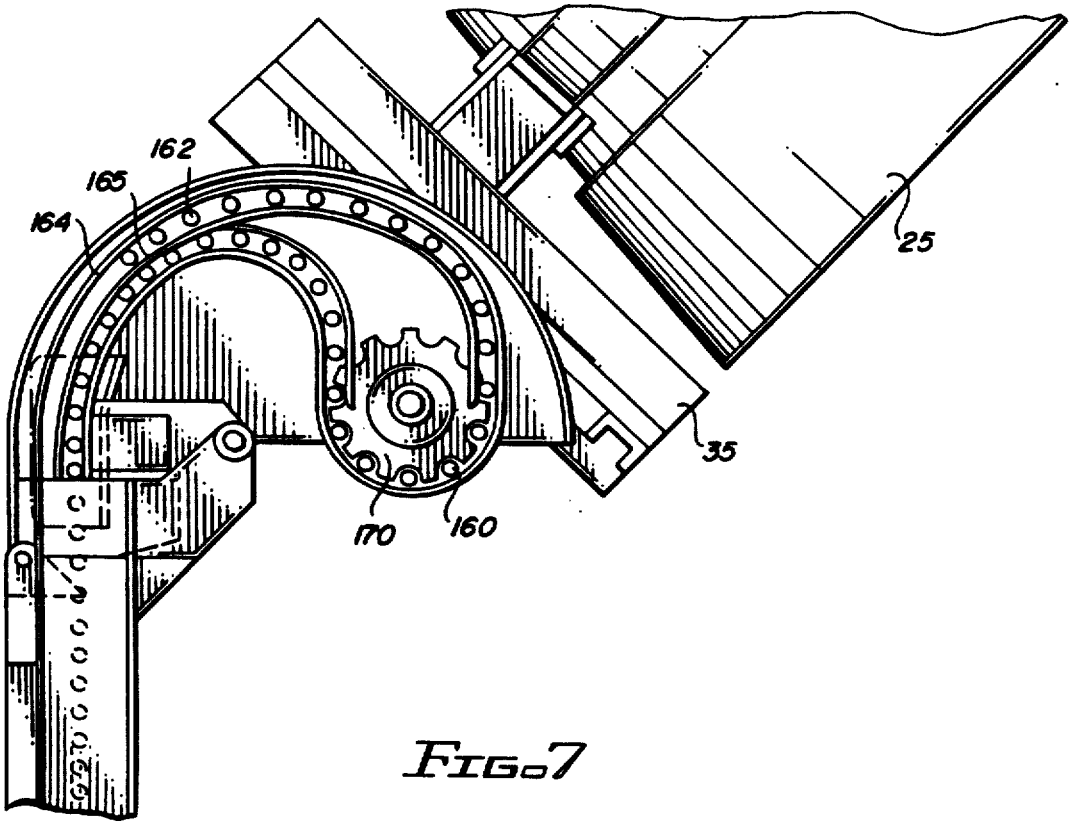

As best seen in FIGS. 5, 6 and 7, the carriage is reciprocated by means of a length of roller chain 160 moveable within the centrally positioned track guide 145. Track guide 145 has two generally square cross-sectional channels 162 and 164 separated by wall 165. The track channels 162 and 164 are positioned adjacent one another extending from the lower end of the lift to approximately the elevation of the cross member. At this point, the channels curve to the rear and diverge extending around opposite sides of sprocket 170. The upper ends of the channels 162 and 164 curve in generally semi-circular fashion to bring the carriage 35 to a dump position when the carriage is at the upper end of the track, as seen in FIG. 6. Similarly, the upper ends of lift arm members 150, 151 are also curved.

The carriage support 132 and attached container-grasping mechanism 30 which comprise the carriage 35 are moved along channels 162 and 164 by means of chain 160 having rollers 182 that guide the chain for movement within the track sections 162, 164. The carriage 35 is attached to one or more selected links of chain by arm 185. Track 162 has an axially extending slot in one side wall to accomodate attachment of the support arm 185. The drive chain comprises a section of chain of finite length. FIG. 7 shows the carriage assembly and chain in the generally raised or dump position. In this position, a portion of the chain 160 extends around the lower half of the drive sprocket 170 and is guided into channel 164. In the lower or home position, the chain 160 and carriage assume the position as generally shown in FIG. 6 with the end of the chain still in engagement with the sprocket wheel. The rotational direction of the sprocket wheel is controlled by drive motor 175 mounted on the upper end of the lift. Limit switches located on the lift along with operator controls serve to control the direction and speed of the raise and lower cycles as will be more fully described hereafter with reference to the electrical and hydraulic operational systems.

The container gripping mechanism 30 is best seen in FIGS. 3, 4 and 5 and is pivotally secured to the carriage 35 at pivot 235 by post 174. Gripping assembly 30 includes a pair of oppositely disposed gripping arms 190 and 192 each having an inner surface which is complementarily engageable with the exterior surface of the container 25. Obviously, the configuration of the gripping arms will vary with the shape and size of the container used and for cylindrical containers an arcuate shape is desirable. In the preferred embodiment for use with generally cylindrical refuse containers, the arms are curved and a space or opening is provided between the distal end of the arms. The inner ends of each of the gripping arms 190 and 192 each terminate at a generally L-shaped bracket 195 which brackets are bolted or otherwise secured to the arms having an extension 198 which is pivotally secured at an intermediate location between a pair of plates 202 and 204 projecting generally horizontally from support 173 carried on post 174. A pivot pin 200 extends through the arm 198 and is oppositely secured to the plates.

Actuators 210 and 212 control the opening and closing of gripping arms 190 and 192, respectively. The head ends of the hydraulic cylinders 210 and 212 are commonly connected to vertical pivot pin 215 secured to support 173. Support 173 is pivotally attached to the lower end of carriage 130 at horizontal pivot shaft 235 through post 174.

Rod 240 of gripping arm cylinder 210 is pivotally attached to the end of arm 198 extending from gripping arm 190. Similarly, the end of rod 242 of gripping arm cylinder 212 is connected to arm 199 extending from gripping assembly 192 at a pivotal connection 201. It will be apparent that retraction of hydraulic cylinder rods 240, 242, will cause the gripping arms 190, 191 to open to the position shown in dotted in FIG. 5 to accept the container. Actuation of the cylinders to extend the respective rods 240 and 242 will cause the gripping arms 190, 192 to close engaging the exterior of the container. The full open position also allows the gripping arms to assume a compact position close to the vehicle to avoid interference with adjacent objects when moving between pick-up location along a route.

Leveling cylinders 250 and 252 operate to maintain the gripping arms in a generally level or horizontal position as the lift assembly 40 extends on a reach and as the lift assembly retracts. Leveling cylinder 250 has its head end pivotally connected to the carriage at connection 254. The rod end of cylinder 250 is attached at clevis 256 to the gripping arm assembly. Similarly, leveling cylinder 252 has its head end connected to the carriage at pivotal connection 258 with the opposite rod end being attached to the gripping arm assembly at clevis connection 260. It will be apparent that retraction and extension of leveling cylinders 250 and 252 will vary the angular position of the gripping mechanism 30 with respect to the carriage support 132. For example, with the loader assembly in the fully retracted position shown in FIG. 2, the gripping mechanism is positioned generally at right angle with respect to the carriage. As the boom assembly is extended outwardly to position the gripping mechanism 30 adjacent the container 25, the angle between the gripping assembly and the carriage changes to maintain the gripping mechanism in a generally horizontal position throughout its movement.

The operation of the loader assembly is controlled by a hydraulic system which includes appropriate manual controls in the vehicle cab such as an open/close gripping mechanism control unit having a control stick; an extend/retract boom control unit having a control stick; and an on/off motor control unit having a control lever, not shown. These control members operate the hydraulic system components shown in detail in FIG. 8. The output of the open/close gripping mechanism control unit is taken from a push-pull cable to operate the spool of hydraulic valve assembly 472. A cable connects the extend-retract control unit to the spool of hydraulic control valve 420 and another cable connects the on/off motor control unit to the spool of hydraulic valve 422.

Figure 8:
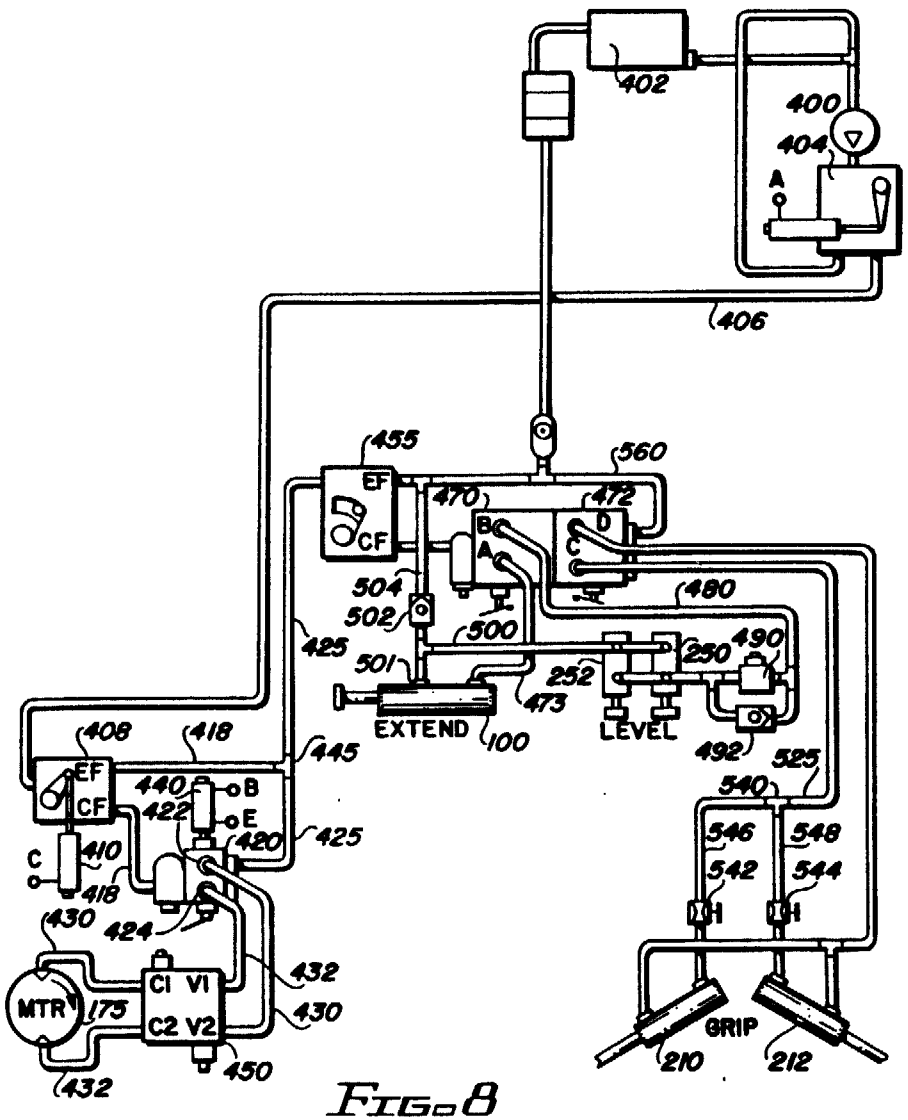
FIG. 8 is a shcematic diagram of the hydraulic system of the loading system.

The hydraulic circuit is best seen in FIG. 8 and when taken in conjunction with electrical diagram FIG. 9 will contribute to an overall understanding of the operation of the present invention.

The hydraulic circuit includes a source of hydraulic fluid pressure including a variable volume pump 400 connected to a reservoir 402. The output volume of pump 400 is controlled by on/off mechanism 404 which in the off-position allows hydraulic fluid to re-circulate to the reservoir and in the on-position directs pressurized fluid through line 406 to the input of priority speed control valve 408. Valve 408 has a pair of output ports, CF (control flow) and EF (excess flow), and serves as a flow divider responsive to control member 410 which, referring to FIG. 9, is responsive to upper limit switch L1 on the boom assembly. The upward movement of the carriage assembly 130 along the lift arm assembly to a predetermined position in the upward direction will initially engage limit switch L1 actuating control member 410 to increase the excess flow through the valve reducing the control flow which has the result of reducing the speed of drive motor 175. It will be noted that the CF port of the valve 408 is connected to control valve 420 by hydraulic line 418. Control valve 420 has a pair of pressure ports 422 and 424 connected by lines 430 and 432, respectively, to the opposite sides of drive motor 175. Valve 420 is a directional control valve manually operated by a control stick or operated by electrical operator 440 responsive to upper and lower limit switches L1 and L2. For example, when carriage 130 reaches the upper limit of travel, the upper limit switch L1 is engaged causing the electrical operator 440 to shift to direct hydraulic fluid through the port 420 of valve 420 reversing the operation of the motor. In the other direction of operation, when the carriage reaches the lower end of its travel, lower limit switch L2 is actuated causing the electrical valve operator 440 to shift in the opposite direction directing pressure fluid through port 424.

Fluid flow from reversing valve 420 is directed to either ports V1 or V2 of hydraulic balancing valve 450 and then through either port C1 or C2 of valve 450 to the motor. The C1 output port of valve 450 is connected to the drive motor 175 via line 430 and the C2 port is connected to the drive motor 175 via line 432. Valve 450 is a balancing valve such as the model IEE13 manufactured by Fluid Control and serves to prevent the hydraulic motor 175 from overrunning and cavitating.

Hydraulic fluid exits control valve 420 via hydraulic line 425 and re-joins the fluid discharged from port EF of valve 408 at tee 445 so that full volume hydraulic flow enters priority valve 455 which is manually pre-set depending on the characteristics of the system. The controlled flow output CF of valve 455 is directed to hydraulic control valve 470. The excess flow port EF is connected to valve 472.

Valve 470 is a directional control valve having ports A and B with the spools being under operator control. Valve 472 has ports C and D. The A port of valve 470 is connected via hydraulic line 473 to the head end of extension cylinder 100. The B port of valve 470 is connected via line 480 to the rod ends of leveling cylinders 250 and 252 across anti-cavitation valve 490. Valve 490 will bypass fluid across check valve 492 to allow free fluid flow to the rod end of leveling cylinders 250 and 252. When the cylinder rods are extending to maintain the gripping arms 191, 192 in a generally horizontal position, the weight of the load on the gripping arms will tend to rapidly extend the cylinders faster than the rate of fluid flow. In this mode of operation, fluid flow will return to port B of valve 470 across valve 490. The check valve will not permit bypass flow and the valve 470 maintains a pre-set pressure differential so as not to create a void in the head end of cylinders 250 and 252.

The head end of cylinders 250 and 252 are connected via hydraulic line 500 to port 501 at the rod end of extension cylinder 100. Check valve 502 in line 504 will allow make-up fluid to flow from reservoir 402 to the extension and leveling cylinders if necessary and the check valve will prevent return flow via line 504.

The operation of extension cylinders 100 and leveling cylinders 250 and 252 are functionally coordinated. Upon operation of valve 470 to cause pressurized fluid to be directed via line 472 to the head end of cylinder 100, the boom arms will extend due to extension of rod 105 causing the lift arm to extend on a reach. As this occurs, fluid discharged from the head end of extension cylinder 100 is directed via line 500 to the rod ends of leveling cylinders 250 and 252 causing them to extend at a controlled rate maintaining the gripping arms 191, 192 in a horizontal position. This occurs because the volume of the rod end of extension cylinder 100 is equal to the combined volume of the rod end chambers of the leveling cylinders. Thus, the leveling cylinders extend at a controlled rate to maintain the gripping assembly in a level condition.

When the loader assembly is retracted, that is the lift arm is moved towards the collection vehicle, the spool of valve 470 is shifted to direct pressurized fluid through output port B across valve 490 to the rod end of cylinders 250 and 252 causing these cylinders to retract. Fluid will flow through the bypass portion of valve 490. The retraction of cylinders 250 and 252 will displace fluid from the head end of the cylinders causing the fluid to return via line 500 to the rod end of extension cylinder 100 causing it to retract. Check valve 502 will prevent return of fluid to the reservoir. Fluid displaced from the head end of extension cylinder 100 will return to the A port of valve 470. Again, the displacement of the leveling cylinders and the extension cylinder are selected so that movement of the boom and leveling are coordinated to maintain the gripping assembly in a generally horizontal position for all boom positions.

Valve 472 is a directional control valve which serves to operate the pair of hydraulic cylinders 210 and 212 which, as has been described above, controls the gripping arms 190, 192 of the gripping assembly. Port C of valve 472 is connected via hydraulic line 525 to the head ends of cylinders 210 and 212 across tee 540 which divides the flow and directs flow through lines 546 and 548. Needle valve 542 is interposed in the hydraulic line 546 connected to the head end of the cylinder 212 and similarly needle valve 544 is connected in the hydraulic line 548 communicating with the head end of cylinder 210. The needle valves may be manually adjusted to control the speed of operation of the cylinders. Return flow from valve 472 to reservoir 402 is via line 560.

Figure 10:
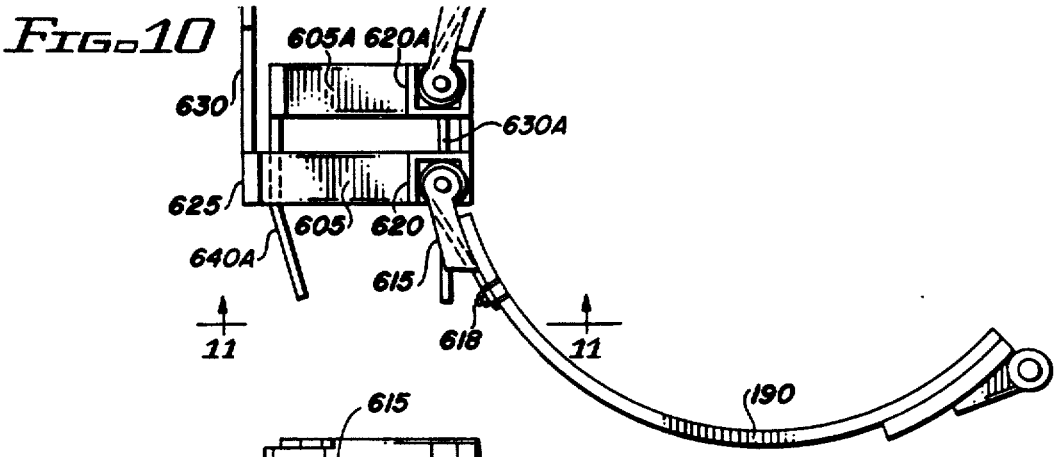
FIG. 10 is a top view of the gripping arms with a removable attachment for collection of contained refuse.
Figure 11:
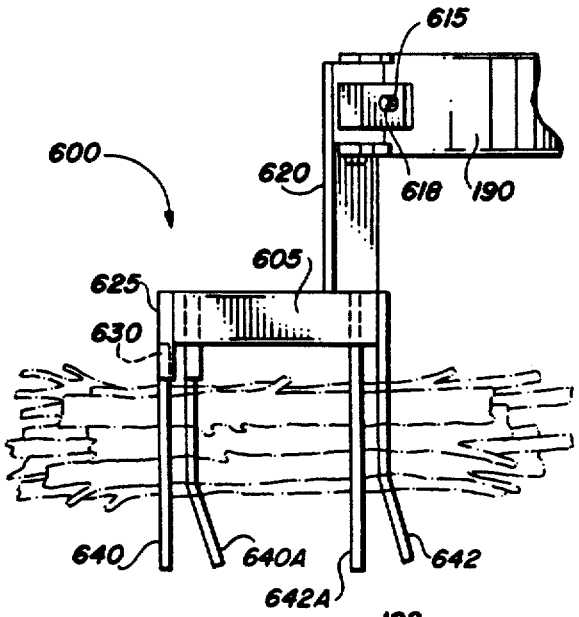
FIG. 11 is a view along line 11—11 of FIG. 10.
Figure 12:
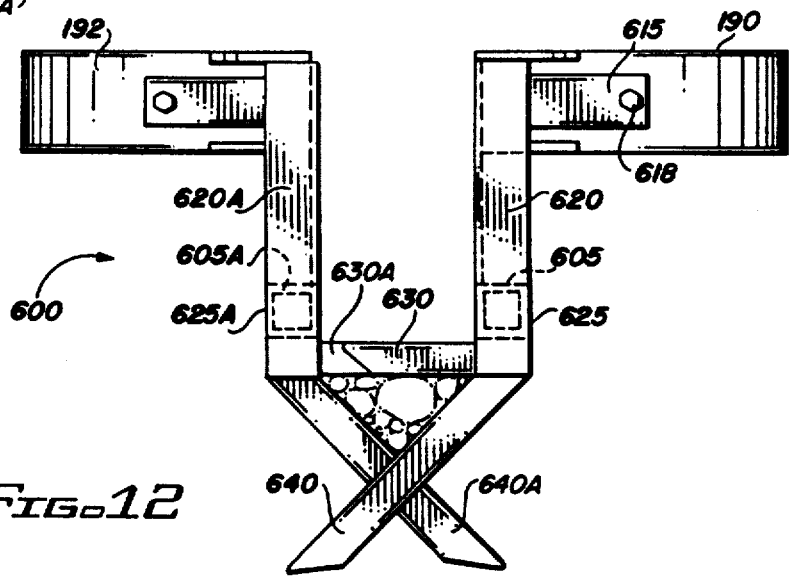
FIG. 12 is a front view of the attachment shown in FIGS. 10 and 11.

FIGS. 10 to 12 show another embodiment of the present invention in the form of a detachable attachment which can be secured to the gripping arms 190, 192 to engage certain types of trash, generally yard debris, limbs and discarded Christmas trees. These types of trash items are difficult to collect and often are not placed in containers but are simply placed curb-side when discarded. Tree limbs are often stacked in this manner. Yard debris is sometimes places in plastic trash bags. Christmas trees after the Christmas season are also often placed along side containers and these items must be manually collected which requires considerable time. With the attachment shown in the above-referenced figures, which is generally identified by the numeral 600, such loose, non-containerized items may be collected using the mechanism of the present invention. A particular advantage is that this attachment is removably secured to the gripping arms and the gripping arms themselves may be used in normal fashion to engage containers and the attachment 600 is available to pick up loose trash.

The attachment includes a pair of members 605 and 605A. Member 605 is secured to the distal end of gripping arm 190 and member 605A is secured to the distal end of gripping arm 192. Member 605 includes a bracket 615 which is detachably secured to the associated gripping arm via a fastener 618 extending through the gripping arm. The bracket 615 supports a vertically extending channel 620 which terminates a distance above the ground surface. A forwardly extending tube 625 is welded or otherwise secured to the lower end of the angle. Similarly, the opposed bracket 605A carries a vertically depending angle 620A which carries a forwardly extending support member 625A at its lower end.

A horizontally extending arm 630 is secured to the underside of support 625 at its forward end positioned so that it defines a clearance space with the lower horizontal edge of associated member 625A. An angularly depending leg 640 extends from the forward end of member 625. A second angularly extending leg 642 is secured as by welding to the underside of support 625 at the rear end thereof. As best seen in FIG. 11, the lower distal portion of leg 642 is bent rearwardly.

Support 625A carries a horizontally extending arm 630A positioned adjacent the rear end of the support spaced inwardly a sufficient distance to provide clearance with leg 642A. Angularly depending legs 640A and 642A extend downwardly so that the opposite pairs of legs in the closed position intersect as shown in FIG. 12. Leg 640A has its lower end bent rearwardly to provide clearance.

When the gripping arms 190, 192 are open, legs 640, 642 and 640A, 642A will move apart a sufficient distance so that a space exists between their lower ends. These legs may then be oppositely positioned about loose debris such as a Christmas tree. When the gripping arms are actuated to a closed position, the legs move towards the position shown in FIG. 12 and the debris will be pinched and retained between the legs and the horizontal arm 630, 630A. The tree or other debris can then be deposited in the vehicle as described above. When the gripping arms are elevated to the dump position, they are opened which will release the tree or other debris into the vehicle.

It will be obvious that the pick up attachment is detachable and may be easily removed. As pointed out above, the attachment does not otherwise interfere with the normal operation of the gripping arms which may be used to pick up containers in the manner described above with the attachment in place.

The loader assembly of the present invention provides significant advantages over the prior art. The loader may be provided as an OEM item or may be easily retrofit to existing vehicles and adapted to a wide range of container types and sizes. The automatic leveling of the container-engaging means prevents spills and reduces operator involvement.

The loader is extremely compact and efficient. Raising and lowering of the carriage may be initiated as the boom and lift extend and retract, respectively, to reduce Another advantage is that the upper end of lift assembly 40 is adjacent the access opening to the vehicle compartment even when the lift is not fully retracted. Thus, the operator can by skillful manipulation of the position of the lift assembly 40 in relation to the dumping of the container, transversely disperse the refuse in the vehicle refuse compartment.

It will be obvious to those skilled in the art to make various changes, alterations and modifications to the refuse collection and loading system described herein. To the extent such changes, alterations and modifications do not depart from the spirit and scope of the appended claims, they are intended to be encompassed herein.

I claim:

1. An improved loader for a refuse vehicle for lifting a refuse container from a surface and emptying the contents thereof into a vehicle refuse compartment having an access area, said improved loader comprising:

(a) a boom having an upper and lower end, said boom being pivotally secured at one exterior side of the vehicle;

(b) means for pivotally moving said boom between a first position generally adjacent said vehicle and a second position with the upper end of said boom extended from said vehicle;

(c) lift means having an upper and lower end, said lift means being pivotally connected to said boom at the upper end thereof whereby the lower end of said lift means moves rectilinearly horizontally away from said vehicle a rate greater than a rate of movement of said lift upper end as said boom is pivoted to said second position and whereby said lower end of said lift means retracts rectilinearly horizontally toward said vehicle as said boom is moved from said [first] *second* position to said [second] *first* position;

(d) carriage means reciprocal along said lift means between the lower end and upper end thereof, said carriage means having a dump position into said access area when said carriage means is at the upper end of said lift means; and (e) gripping means carried by said carriage means for selectively gripping and releasing said refuse container at said second position.

2. An improved loader for a refuse vehicle for engaging and lifting a refuse container from an on-site location to a dumping position into a vehicle refuse compartment and returning the empty container to the on-site location, said improved loader comprising:

(a) a boom assembly including a first boom member pivotally secured to said vehicle at a first location and a second boom member pivotally secured to said vehicle at a second location, said first and second boom members being generally parallel and being secured to a cross member at third and fourth pivot locations;

(b) boom actuator means for moving said boom assembly between a first retracted position with the boom assembly generally adjacent said vehicle and a second extended position;

(c) a lift assembly having an upper and lower end, said upper end being secured to said cross member whereby the upper and lower ends of said lift assembly moves away from said vehicle as said boom is pivoted outwardly on a reach and said upper and lower ends of said lift assembly retract toward the vehicle as the boom is retracted with said lower end extending a rate greater than the upper end of said lift assembly;

(d) said lift assembly including a rail guide assembly and a drive chain track containing a drive chain, said rail guide having a lower section and a curved upper end having its distal end located adjacent said access area at least when the boom and lift assemblies are retracted;

(e) carriage means including a carriage support having roller means engaged in said rail guide assembly and operatively connected to said drive chain and further including means for operatively driving said chain bi-directionally in said drive chain track;

(f) container engaging means carried on said carriage and further including actuator means operatively connected to engage or release said engaging means; and (g) leveling actuator means for selectively positioning said container engaging means, said leveling actuator means and said extension actuator means being cooperative to maintain said container engaging means in a predetermined position as said boom and lift assemblies extend and retract.

3. An improved loader for a refuse vehicle for lifting a refuse container from a surface and emptying the contents thereof into a vehicle refuse compartment having an access opening, said improved loader comprising:

(a) a boom having an upper end including a cross member and a lower end, said boom being pivotally secured at one exterior side of the vehicle;

(b) means for pivotally moving said boom between a first position generally adjacent said vehicle and a second position with the upper end of said boom extended from said vehicle;

(c) lift means having an upper and lower end, said lift means being pivotally connected to said boom at the upper end thereof whereby the lower end of said lift means moves away from said vehicle as said boom is pivoted to said second position and said lower end of said lift means retracts toward said vehicle as said boom is moved from said first position to said second position, said lift means comprising a guide rail including means defining roller tracks and means defining a drive chain track, said guide rail being secured to said cross member and having a lower portion and an arcuate upper portion having its distal end terminating downwardly in the direction of said access opening when said boom and lift means are retracted;

(d) carriage means reciprocal along said lift means between the lower end and upper end thereof, said carriage means having a dump position into said access opening when said carriage means is positioned at the upper end of said lift means; and (e) gripping means carried by said carriage means for selectively gripping and releasing said refuse container.

4. The loader of claim 3 including means for maintaining said gripping means in a predetermined position relative to said surface as said boom and lift means extend and retract.

5. The loader of claim 3 in which said carriage means includes a carriage support including roller means for movement along said roller tracks of said lift means and drive chain means housed in said drive chain track for movement therein and further including means for driving said drive chain in said track and means for operatively controlling the speed, acceleration and deceleration thereof.

6. The loader of claim 5 further wherein said gripping means includes a pair of opposed first and second gripping arms operatively mounted on said carriage means and further including hydraulic actuator means for opening and closing said first and second gripping arms with respect to each other in order to releasably retain and release said refuse container.

7. The loader of claim 6 wherein said gripping arms are pivotally connected to said carriage means and further including linear actuator means for angularly adjusting the position of said gripping arms with respect to said carriage means.

8. The loader of claim 7 wherein said means for extending said boom comprises at least one extension actuator and wherein said boom extension actuator and said gripping arm actuator means are hydraulically interconnected and cooperatively sized to maintain said gripping arms in a substantially horizontal position as said boom and lift means extend and retract.

9. The loader of claim 3 including a control circuit having limit switches operatively engaged by said carriage means at predetermined locations to control the movement of said carriage means.

10. The loader of claim 6 further including detachable arms extending from each of said gripping arms adapted to engage non-containerized refuse.

*11. An improved loader for a refuse vehicle for lifting a refuse container from a surface and emptying contents thereof into a vehicle refuse compartment having an access area, said improved loader comprising:*

*(a) a boom assembly including:*

*(i) a boom having first and second ends, said boom being secured for pivotal movement toward and away from an exterior of the vehicle;*

*(ii) a lift arm having an upper and lower end, said lift arm being connected to said boom;*

*(iii) power means for pivotally moving said boom assembly from a first retracted position and to a second extended position with said boom extended from said vehicle with the upper and lower ends of the lift arm moving away from said vehicle as said boom assembly moves to said second position and with the lower end of said lift arm moving generally rectilinearly horizontally away from said vehicle at a rate greater than a rate of movement of said lift arm upper end as said boom assembly moves to said second position and whereby said lower end of said lift arm retracts generally rectilinearly horizontally toward said vehicle as said boom assembly is moved from said second position to said first position;*

*(b) carriage means reciprocal along said lift arm between the lower end and upper end thereof, said carriage means having a dump position into said access area when said carriage means is at the upper end of said lift arm; and*

*(c) gripping means carried by said carriage means for selectively gripping and releasing said refuse container.*

*12. The loader of claim 11 further including leveling means for maintaining said gripping means in a predeter-*

*mined position relative to said surface at least at predetermined locations as said boom assembly extends and retracts.*

*13. The loader of claim 11 wherein said power means comprises at least one hydraulic extension and retraction actuator and wherein said gripping assembly includes at least one gripping hydraulic actuator leveling means, said hydraulic extension and retraction actuator and said gripping hydraulic actuator leveling means being hydraulically interconnected and cooperatively sized to maintain said gripping arm assembly in a substantially horizontal position as said boom assembly extends and retracts.*

*14. The loader of claim 11 wherein said power means includes at least a first actuator and said gripping assembly includes at least a second actuator, said first and second actuators being operatively interconnected to maintain said gripping assembly in said substantially horizontal position.*

*15. An improved loader for mounting on a collection vehicle for lifting a refuse container from a surface and emptying contents of the container into a vehicle refuse compartment, said loader comprising:*

*(a) a boom assembly secured for pivotal movement at one side of the vehicle, said boom assembly having a lift arm having an upper and lower end, said lift arm extensible from a first position adjacent the vehicle to a second position with the lower end of the lift arm extended from the vehicle;*

*(b) power means operatively connected to said boom assembly to cause said lift arm to extend to said second position with both the upper and lower ends thereof moving away from the vehicle and with the lower end moving generally rectilinearly horizontally and at a rate greater than a rate of movement of the upper end of the lift arm and whereby said lower end of said lift arm retracts generally rectilinearly horizontally toward said vehicle as said lift arm is moved from said second position to said first position;*

*(c) carriage means reciprocal along said lift arm from the lower end to an elevated dump position in which the container contents are caused to fall by gravity into the vehicle refuse compartment; and*

*(d) gripping means associated with said carriage means for selectively gripping and releasing said refuse container.*

*16. A method of loading refuse in a container into a vehicle having a refuse compartment with an access area, said method comprising:*

*(a) providing a boom assembly associated with said vehicle, said boom assembly being secured for pivotal movement and having a lift arm with an upper and lower end;*

*(b) extending said boom assembly causing said lift arm to move from said vehicle with the upper and lower ends of the lift arm moving in an outward direction with the lower end moving at a rate greater than the upper end from a first retracted position to a second position with the lower end of the lift arm adjacent the container, said lower end of said lift arm moving from said first position to said second position along a generally rectilinearly horizontal path to a position adjacent the container;*

*(c) gripping said container;*

*(d) elevating said container from the lower end of the lift arm to an elevated and dump position in which the container is positioned to cause the contents thereof to fall by gravity into the access area and refuse compartment; and*

*(e) returning the emptied container to a predetermined position and releasing same.*

* * * * *